Aug. 31, 1954     W. M. A. ANDERSEN     2,688,121
ULTRASONIC DELAY LINE
Filed Nov. 3, 1951
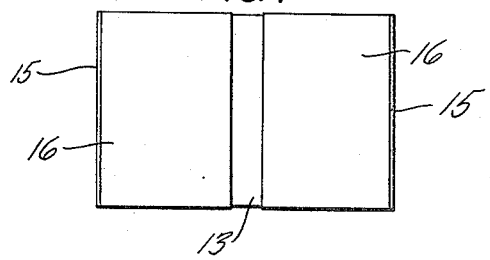
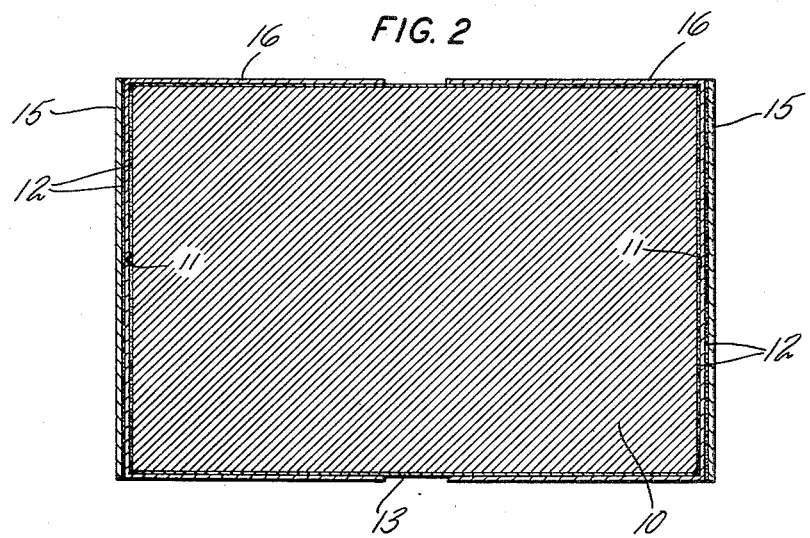
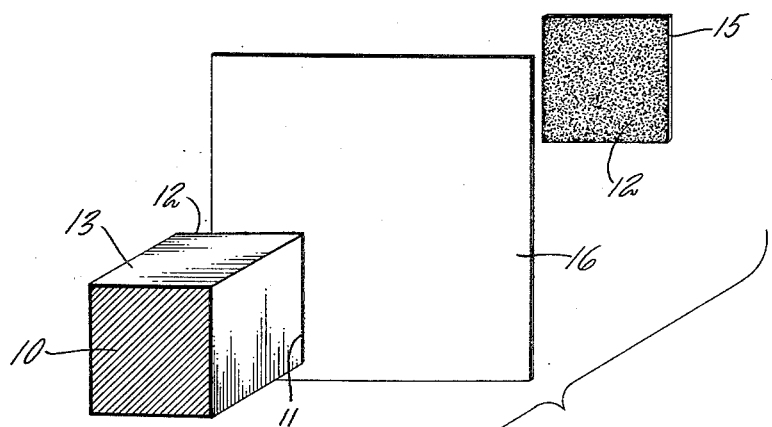
INVENTOR
WALTHER M. A. ANDERSEN
BY Lindsey and Prutzman
ATTORNEYS Patented Aug. 31, 1954

2,688,121

UNITED STATES PATENT OFFICE 2,688,121

ULTRASONIC DELAY LINE

Walther M. A. Andersen, Hartford, Conn., assignor to Andersen Laboratories, Inc., Hartford, Conn., a corporation of Connecticut Application November 3, 1951, Serial No. 254,725

1 Claim. (Cl. 333—30)

The present invention relates to improvements in ultrasonic delay lines and, more particularly, to a novel construction for an ultrasonic delay line and the method of making same.

As is well known, an ultrasonic delay line may consist of a transmitting crystal and a receiving crystal spaced apart by acoustically suitable material, the separating distance being such as to provide the predetermined desired time delay. For high precision work such as in the testing of radar equipment, it has been proposed to construct ultrasonic delay lines by cementing quartz crystals to the opposite ends of a silver-coated quartz bar. However, this form of ultrasonic delay line has not met with success heretofore because it has not been possible to produce the same in any quantity with required precision. A principal defect of such prior art ultrasonic delay lines has been in the bonding of the crystals to the quartz bar since the uniformity of the bond is critical, and any defect therein as a result of manufacture, or occurring later such as by rupture of the silver coating from the quartz which frequently occurs, renders the ultrasonic time delay line unsatisfactory for its intended purpose.

The object of the present invention is to provide an improved construction of an ultrasonic delay line of the type referred to here and a method of manufacturing same whereby efficient and accurate delay lines may be produced in quantity with a minimum of failure and rejections.

Other objects will be in part obvious, and in part pointed out more in detail hereinafter.

The invention accordingly consists in the features of construction and many apparently widely different embodiments of this invention could be made without departing from the scope thereof, it is intended that all matter contained in the above description or shown in the accompanying drawings shall be interpreted as illustrative and not in a limiting sense.

Referring to the drawings:

Fig. 1 is a side view of an ultrasonic delay line constructed in accordance with the invention;

Fig. 2 is an enlarged longitudinal cross-sectional view thereof; and

Fig. 3 is a fragmentary exploded perspective view of the ultrasonic delay line showing the elements at one end thereof prior to assembly.

Referring to the embodiment shown in the drawings and particularly the cross sectional view of Fig. 2, it will be seen that the bulk of the device is provided by a delay medium 10 which is a bar or rod composed of material acoustically suitable for conducting sound in the ultrasonic range. In a precision device, the particular material selected as a delay medium is preferably one which will have a minimum distortional and attenuation effect on the signal and one which will provide uniform and constant results, even when subjected to widely varying conditions such as temperature change and one which is available commercially and can be fabricated efficiently in manufacturing operations. Among the readily available commercial materials useful for this purpose, the most important and generally used material is quartz. However, certain glasses having physical properties similar to quartz may be employed as well as certain metals such as magnesium and alloys such as Invar or like alloys which are isoelastic.

The shape of the bar or rod 10 is not critical. Usually a bar of round or square cross section will be selected as a matter of convenience. In the embodiment shown in the drawings, there is illustrated the use of a bar of quartz which is square in transverse cross section and is rectangular in longitudinal cross section. The end faces of the bar as indicated at 11 are made parallel and flat such as by lapping. The cross-sectional area of the bar can be varied as desired to accommodate the size of the transmitting and receiving crystals selected. I have found that, in general, a bar of the order of ½" square cross-section will be satisfactory. The length of the bar will depend, of course, upon how much time delay is desired. When the device is to be used for the testing of radar equipment, a length in the range of ½" to 2½" is usually selected.

The bar 10 forming the delay medium is preferably coated with electrical conducting material as indicated at 13 in order to provide a suitable ground for the device. The coating material preferably is silver but it might comprise any other good conducting metal such as aluminum. The conducting material may be applied to the bar 10 in any convenient manner such as by conventional silvering processes, other forms of chemical deposition, plating, etc.

In the preparation of the device of the present invention, the bar 10, which has been coated with conducting material, is then treated to remove all of the conducting material from the end faces 11. For best results in accordance with the invention, the end faces 11 should be free of foreign material adhering thereto. Usually a mechanical cleaning of the faces 11, such as by brushing, etc., will suffice to clean the surfaces of the quartz.

There is then applied to the faces 11 of the bar 10 a thin coating 12 of a bonding material. The type of bonding material preferred is one whose bonding action is not dependent upon evaporation of solvents. In general, any bonding material which will solidify by chemical action such as a thermosetting resin, for example, will provide a satisfactory bonding film. As a specific example, I have found that the bonding agents of the type identified as ethoxylenes such as sold under the trade name Araldite Type XV will operate very effectively. For convenience of application, it may be desirable to disperse or dissolve the bonding agent in a solvent or thinner but, in that event, the solvent or thinner is evaporated off before the device is assembled. In the case of the ethoxylenes, a suitable thinner may be acetone. The bonding material may be applied to the ends of the bar 10 in any suitable manner, such as by dipping or by brushing the bonding material thereon. In general, it is desirable to keep the coating of the bonding agent as thin as possible to minimize interference and distortion.

The faces of the crystals 15, which usually are formed of quartz and which comprise the transmitting and receiving crystals of the delay line, are similarly treated, i. e., the faces are cleaned and then coated on one side with the aforesaid bonding material. After the bonding material has been applied to the faces of the crystals and the ends of the bar 10, the solvent utilized, if any, is evaporated from the bonding film. This is important because the presence of evaporative material in the bonding material will result in non-uniformity and gas pockets in the bonding film when the bond is cured.

After the end faces of the bar 10 and the faces of the crystals 15 have been prepared as previously described, a relatively large but thin sheet of metal foil 16, such as tinfoil or aluminum foil, is wrapped around each end of the bar 10. The thickness of the foil may vary somewhat, depending on the frequency used, and for the particular purpose herein referred to the thickness will generally come within the range of .0001 and .0005". The end of the bar 10 is placed generally in the center of the sheet 16 and then the edge portions of the sheet are brought inwardly about the sides of the bar 10. The dimensions of the sheet 16 are such that, with the edge portions thereof wrapped around the body of the bar 10, there is provided an electrical connection or ground to the metallic coating 13 thereon. In actual practice it is desirable to apply a coating of cement, such as collodion, to the edge of the foil which firmly retains the foil in contact with the metallic coating on the bar 10.

With the sheets of metal foil 16 wrapped in place about the ends of the bar 10, the receiving and transmitting crystals 15 are then clamped in place with light pressure and moderate heat is applied. The crystals 15 are quartz crystals, usually about .004" in thickness and conforming in shape to the periphery of the bar 10. After partial curing of the bonding agent, it is then desirable to increase the clamping pressure and then completely set the bond. With thermosetting bonding materials, the bond is set by curing the material with the application of heat.

By constructing the delay line as described above and by following the manufacturing procedure set forth, it is possible to produce ultrasonic delay lines which will meet the specifications of accuracy and dependability required for precision testing instruments and it is possible to produce these devices in quantity with few failures and rejections. The delay lines so produced will accomplish all of the functions of delay lines previously produced while at the same time the defects of the prior delay lines, particularly those resulting from fracture or separation of the crystals from the bar providing the delay medium, are completely avoided.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claim is intended to cover all of the generic and specific features of the invention herein described and all statements of the scope of the invention which, as a matter of language, might be said to fall therebetween.

I claim as my invention:

An ultrasonic delay line comprising a quartz bar having flat and parallel end faces, a metallic coating on the side surfaces of the bar, a thin sheet of metal foil wrapped about each end face of the quartz body and extending along the metallic coating, means holding the foil in contact with the coating, a quartz crystal on the surface of the foil opposite from the end faces of the quartz bar and parallel thereto, and a non-evaporative type bonding agent forming a continuous bonding layer between the crystals and the foil and between the foil and the end faces of the quartz bar.

References Cited in the file of this patent

UNITED STATES PATENTS

| Number | Name | Date |
|---|---|---|
| 2,421,026 | Hall et al. | May 27, 1947 |
| 2,434,143 | Chilowsky | Jan. 6, 1948 |
| 2,458,581 | Firestone et al. | Jan. 11, 1949 |
| 2,512,130 | Arenberg | June 20, 1950 |
| 2,589,403 | Kurie | Mar. 18, 1952 |
| 2,590,405 | Hansell | Mar. 25, 1952 |